United States Patent
Meinert

(10) Patent No.: US 7,712,817 B2
(45) Date of Patent: May 11, 2010

(54) CONVERTIBLE VEHICLE

(75) Inventor: Stefan Meinert, Wallenhorst (DE)

(73) Assignee: Wilheim Karmann GmbH, Osnabruck (DE)

( * ) Notice: Subject to any disclaimer, the term of this patent is extended or adjusted under 35 U.S.C. 154(b) by 625 days.

(21) Appl. No.: 11/570,388

(22) PCT Filed: Jun. 1, 2005

(86) PCT No.: PCT/DE2005/000989

§ 371 (c)(1),
(2), (4) Date: Dec. 20, 2006

(87) PCT Pub. No.: WO2005/120875

PCT Pub. Date: Dec. 22, 2005

(65) Prior Publication Data

US 2008/0036237 A1    Feb. 14, 2008

(30) Foreign Application Priority Data

Jun. 11, 2004   (DE) ........................ 10 2004 028 467

(51) Int. Cl.
*B60J 7/14* (2006.01)
(52) U.S. Cl. ............. 296/108; 296/107.07; 296/107.16; 296/107.17
(58) Field of Classification Search ............ 296/107.01, 296/107.16, 107.17, 108, 116, 107.08, 107.07
See application file for complete search history.

(56) References Cited

U.S. PATENT DOCUMENTS

| | | | |
|---|---|---|---|
| 2,234,040 A | 3/1941 | Carr | |
| 2,303,789 A | 12/1942 | Garr | |
| 2,957,725 A | 10/1960 | Ford | |
| 3,536,354 A | 10/1970 | Ingram | |
| 4,543,747 A | 10/1985 | Kaltz et al. | |
| 4,784,428 A | 11/1988 | Moy et al. | |
| 5,195,798 A | 3/1993 | Klein et al. | |
| 5,746,470 A * | 5/1998 | Seel et al. ................... | 296/108 |
| 6,019,416 A * | 2/2000 | Beierl .................... | 296/107.17 |
| 6,039,383 A * | 3/2000 | Jambor et al. ............... | 296/108 |
| 6,073,988 A | 6/2000 | Huber et al. | |
| 6,086,136 A * | 7/2000 | Jambor et al. .......... | 296/107.17 |
| 6,123,381 A | 9/2000 | Schenk | |
| 6,131,988 A | 10/2000 | Queveau et al. | |
| 6,142,555 A | 11/2000 | Huber | |
| 6,257,648 B1 | 7/2001 | Schenk | |

(Continued)

FOREIGN PATENT DOCUMENTS

DE    19936252    2/2001

(Continued)

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

A convertible vehicle has a movable roof with a rearward roof part closed divided into a middle region including a rear window and two lateral outer regions. The middle region is upwardly displaceable with respect to the outer regions during the opening of the roof. The movable roof is configured such that the top end of the middle region is connected to the forward roof part, which is held above the rearward roof part when the roof is open. The lower region of the middle region is connected to a movement linkage to move this region upwardly relative to the outer regions during the opening of the roof.

16 Claims, 8 Drawing Sheets

U.S. PATENT DOCUMENTS

| | | | |
|---|---|---|---|
| 6,283,532 | B1 | 9/2001 | Neubrand |
| 6,302,470 | B1 | 10/2001 | Maass et al. |
| 6,315,349 | B1 * | 11/2001 | Kinnanen .................... 296/108 |
| 6,382,703 | B1 * | 5/2002 | Queveau et al. ......... 296/107.17 |
| 6,390,532 | B1 | 5/2002 | Mac Farland |
| 6,422,637 | B1 * | 7/2002 | Mac Farland .......... 296/107.15 |
| 6,425,620 | B1 * | 7/2002 | Schutt et al. ........... 296/107.07 |
| 6,485,085 | B1 | 11/2002 | Pecho et al. |
| 6,497,446 | B2 | 12/2002 | Obendiek |
| 6,513,857 | B2 | 2/2003 | Pfertner et al. |
| 6,582,009 | B2 | 6/2003 | Wezyk et al. |
| 6,592,169 | B2 | 7/2003 | Obendiek |
| 6,629,718 | B2 | 10/2003 | Bauer et al. |
| 6,652,017 | B2 * | 11/2003 | Wagner et al. ......... 296/107.08 |
| 6,729,672 | B2 * | 5/2004 | Neubrand ............. 296/107.07 |
| 6,857,685 | B2 | 2/2005 | Wagner et al. |
| 6,866,324 | B2 | 3/2005 | Neubrand |
| 7,134,708 | B2 * | 11/2006 | Russke ....................... 296/108 |
| 7,152,905 | B2 * | 12/2006 | Queveau et al. ............. 296/108 |
| 7,325,857 | B2 * | 2/2008 | Queveau et al. ............. 296/108 |
| 2001/0033089 | A1 | 10/2001 | Maass |
| 2001/0042992 | A1 * | 11/2001 | Obendiek .............. 296/107.17 |
| 2002/0050727 | A1 | 5/2002 | Hasselgruber et al. |
| 2002/0158485 | A1 * | 10/2002 | Obendiek .............. 296/107.07 |
| 2002/0185886 | A1 * | 12/2002 | Obendiek ................... 296/108 |
| 2003/0047962 | A1 | 3/2003 | Guillez et al. |
| 2003/0160475 | A1 | 8/2003 | Tohda et al. |
| 2003/0230907 | A1 | 12/2003 | Sasaki et al. |
| 2005/0184554 | A1 * | 8/2005 | Queveau et al. ............. 296/108 |
| 2006/0097543 | A1 * | 5/2006 | Russke ................... 296/107.16 |
| 2006/0131923 | A1 * | 6/2006 | Russke et al. ............... 296/108 |
| 2008/0030044 | A1 * | 2/2008 | Schroder ................ 296/107.17 |
| 2008/0093880 | A1 * | 4/2008 | Westermann et al. .. 296/107.17 |

FOREIGN PATENT DOCUMENTS

| | | |
|---|---|---|
| DE | 10248348 A1 * | 5/2004 |
| EP | 1092580 A1 * | 4/2001 |
| EP | 1857312 A2 * | 11/2007 |
| FR | 2805219 A1 * | 8/2001 |
| WO | WO-03/091053 A | 11/2003 |
| WO | WO 03091052 A1 * | 11/2003 |
| WO | WO 03091053 A1 * | 11/2003 |
| WO | WO 2004/037585 A1 | 5/2004 |

* cited by examiner

CONVERTIBLE VEHICLE

REFERENCE TO RELATED APPLICATIONS

This application is the United States national phase application of Patent Cooperation Treaty Application No. PCT/DE2005/000989, filed Jun. 1, 2005, which claims priority from German patent application No. DE 10-2004-028467.9, filed Jun. 11, 2004, the entire content of both of which are incorporated herein by reference.

FIELD OF THE INVENTION

The invention relates to a convertible vehicle having a rear roof part with a middle region, which includes a rear window and which is displaceable with respect to outer regions of the rear roof part during the roof movement.

BACKGROUND OF THE INVENTION

In order to enlarge the trunk space remaining under a stowed roof, it is desirable with convertible vehicles in which the rear roof part is stowed at the bottommost position in the open roof position to stow the rear roof part as high as possible. However, this is limited by roof parts stowed thereover. In particular when the rear roof part has a roof part arched in the opposite direction disposed above it, the longitudinal edge regions of the roof parts frequently contact one another so that the rear roof part lying at the bottommost position cannot be stowed higher. However, space remains between said roof parts in the region at the center with respect to the transverse direction of the vehicle due to the arching in the opposite direction. It can therefore be sensible to divide the rear roof part and to displace it upwardly with respect to the outer regions during the opening of the roof so that the intermediate space is utilized and the remaining trunk space is enlarged.

DE 199 36 252 C2 shows a convertible vehicle of this type including a rear window which is connected to the lower ends of the outer regions in a pivotally movable manner and which can be pivoted relatively upwardly around the pivot joint of the lower connection in its upper region via a lever mechanism on the opening of the roof. In this connection, the upper end of the rear window, however, rises out of the connection to a roof part arranged at the front of it so that separate closing spigots or centering elements of like type must be provided for the sealing of this connection with a closed roof. The sealing between the roof parts is thereby made more difficult. In addition, the lever mechanism projects into the head region of the vehicle occupants and is inconvenient even with additionally provided trim. Furthermore, the raising of the rear window only relates to the rear end whereas the forward end remains fixedly connected to the outer regions so that the trunk space cannot be enlarged there. At the same time, the centering spigot or a similar part projects a long way to the rear into the trunk, whereby space is actually lost here.

It is the underlying problem of the invention to avoid the aforesaid disadvantages as much as possible in a generic convertible vehicle.

SUMMARY OF THE INVENTION

According to one embodiment of the invention, a convertible vehicle includes a movable roof whose rearward roof part, with respect to the direction of travel when the roof is closed, is divided into a middle region comprising a rear window and two lateral outer regions. The middle region is upwardly displaceable with respect to the outer regions during the opening of the roof. The top end of the middle region, at the top when the roof is closed, is connected to a forward roof part, which is arranged in front of the rearward roof part when the roof is closed. The forward roof part is disposed above the rearward roof part, at least partly, when the roof is open. The middle region is connected at its lower region to a movement linkage displacing this region upwardly relative to the outer regions during the opening of the roof.

In this embodiment, since the top end of the middle region is connected to the forward roof part, the connection between the parts is ensured at all times so that when the roof is closed, no threading back in has to take place and thus a sealing between the said roof parts remains possible in a simple manner. No parts project a long way to the rear into the trunk, whereby the latter gains space behind the roof when it is stowed. At the same time, due to the engagement of the movement device effecting the relative displacement in the lower region of the rear roof part, a restriction of the head space of the occupants is avoided. It is also achieved that the middle region is raised with respect to the outer areas at this end so that the trunk can be enlarged over the total length of the rearward roof part when the roof is open.

According to another embodiment of the invention, the movement linkage is moved along in a driven manner during the opening or closing of the roof.

In accordance with another embodiment of the invention, the middle region forms the upper lever of a two-bar linkage whose lower lever is co-movably connected to a lateral lever of the roof movement or to the main bearing. By this arrangement, particularly simple kinematics may be provided for the relative movement of the middle region which permit a movement free of canting and defined by the roof movement in a compulsory manner. Further the lower lever only projects a little upwardly beyond the beltline so that the encroachment on the interior space is minimized.

In particular when the lower lever of the two-bar linkage engages in a pivotally movable manner in the third or even the fourth of the middle region at the bottom when the roof is closed, the view to the rear is also practically not affected.

With the invention, the rearward roof part and the forward roof part may be made in each case as at least substantially rigid construction units that are separate from one another with respect to their outer surfaces so that the invention can in particular also be applied to so-called retractable hardtops.

If the outer regions and the middle region of the rear roof part are advantageously connected in a pivotally movable manner to the forward roof part in every phase of the roof movement, no problem occurs at any time with respect to the rotation of the parts to one another. The sealing can be carried out without any increased effort.

In particular when pure pivot joints are used both for the connection of the lower lever of the two-bar linkage and for the connection of the upper and lower levers of the two-bar linkage and for the connection of the upper lever to the forward roof part, the relative movement is optimized in its course and runs smoothly integrated in the total roof movement.

It is particularly helpful in this respect for the exertion of a pressing force onto the sealing between the middle region and the outer regions in the closed roof position for the lower lever of the two-bar linkage to be held in near proximity to a dead center position with a closed roof.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE INVENTION

Figure 1:
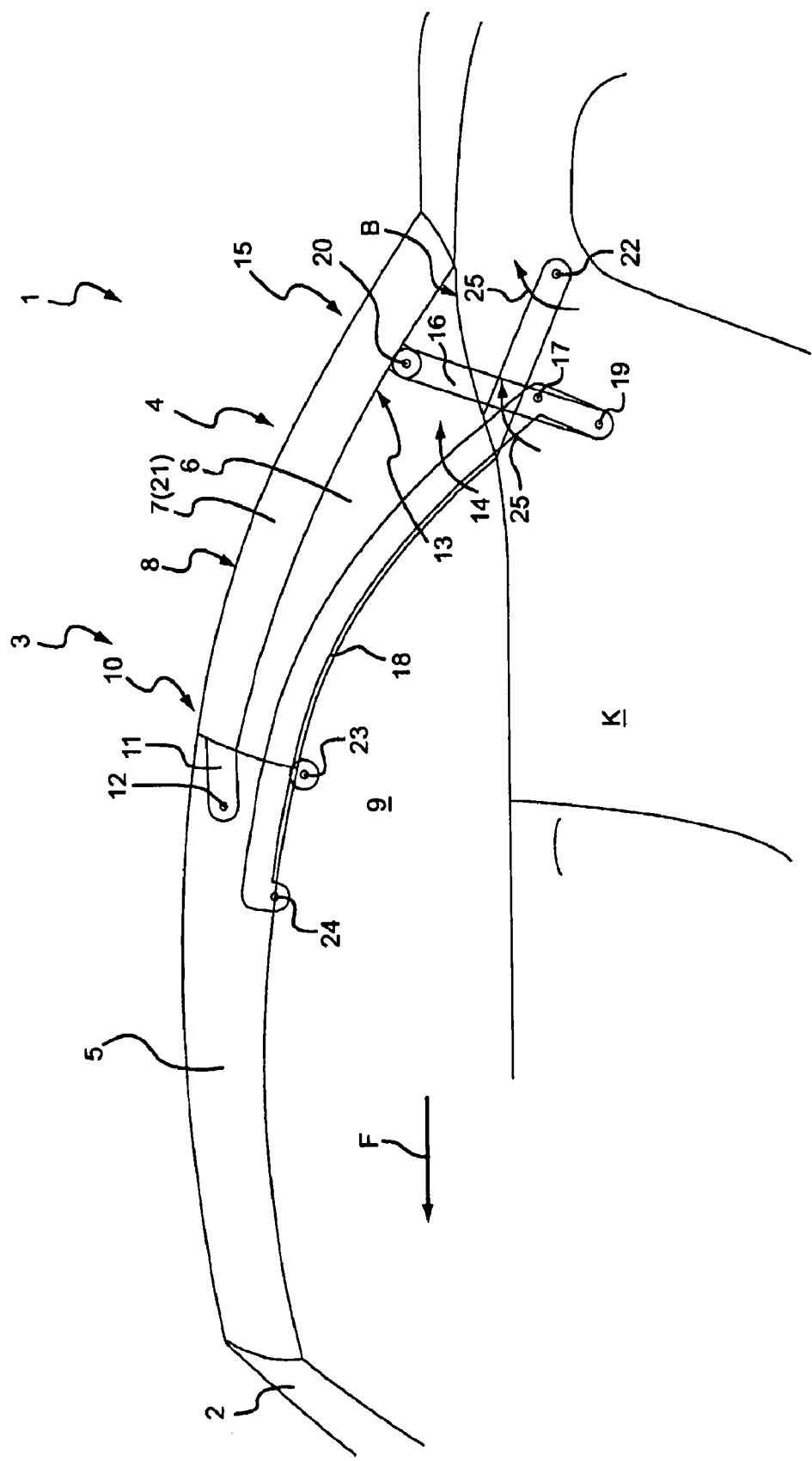
FIG. 1 is a schematic, broken open side view of a convertible vehicle in accordance with the invention with a closed roof.
Figure 2:
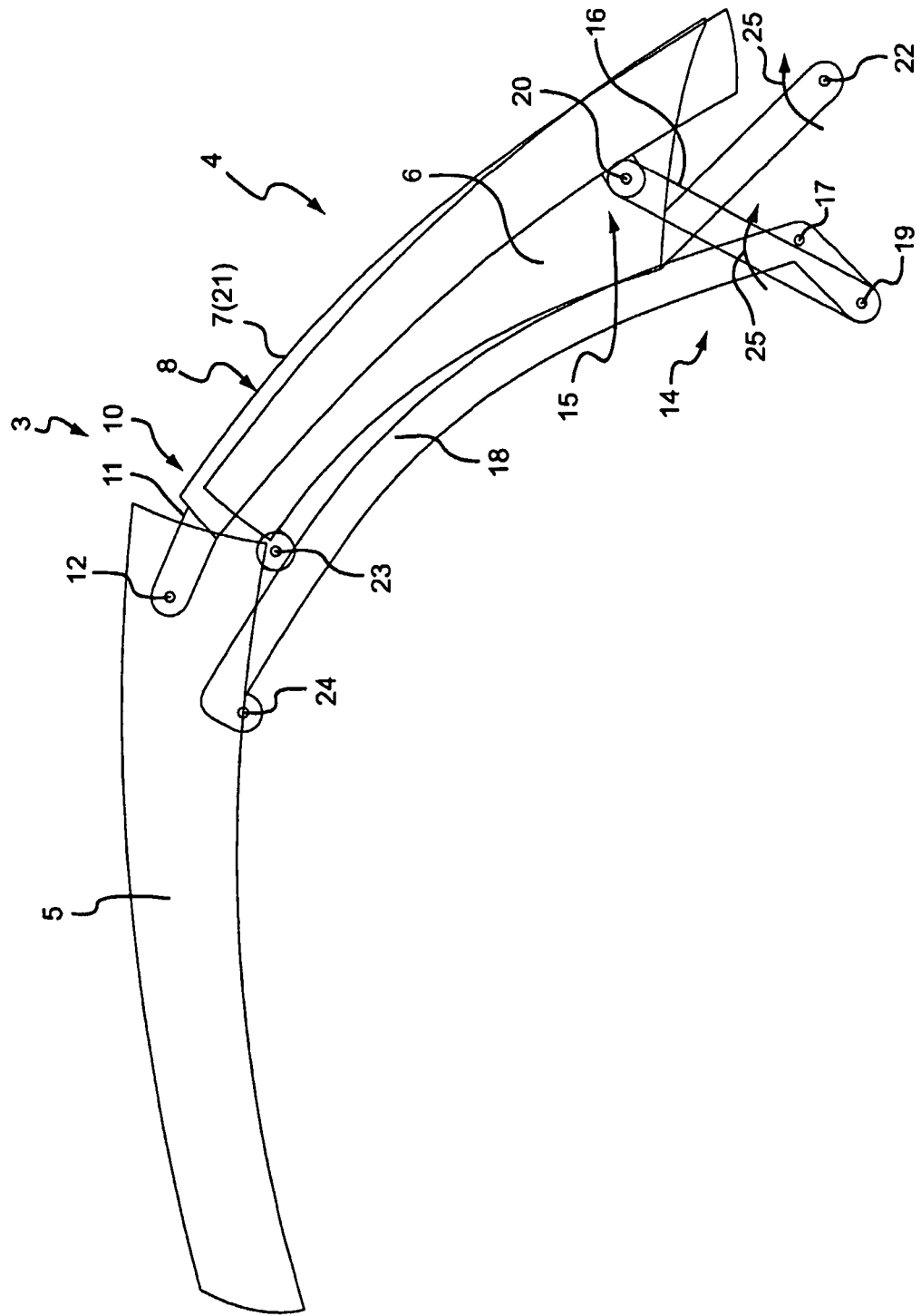
FIG. 2 shows the roof of FIG. 1 as its opening starts.
Figure 3:
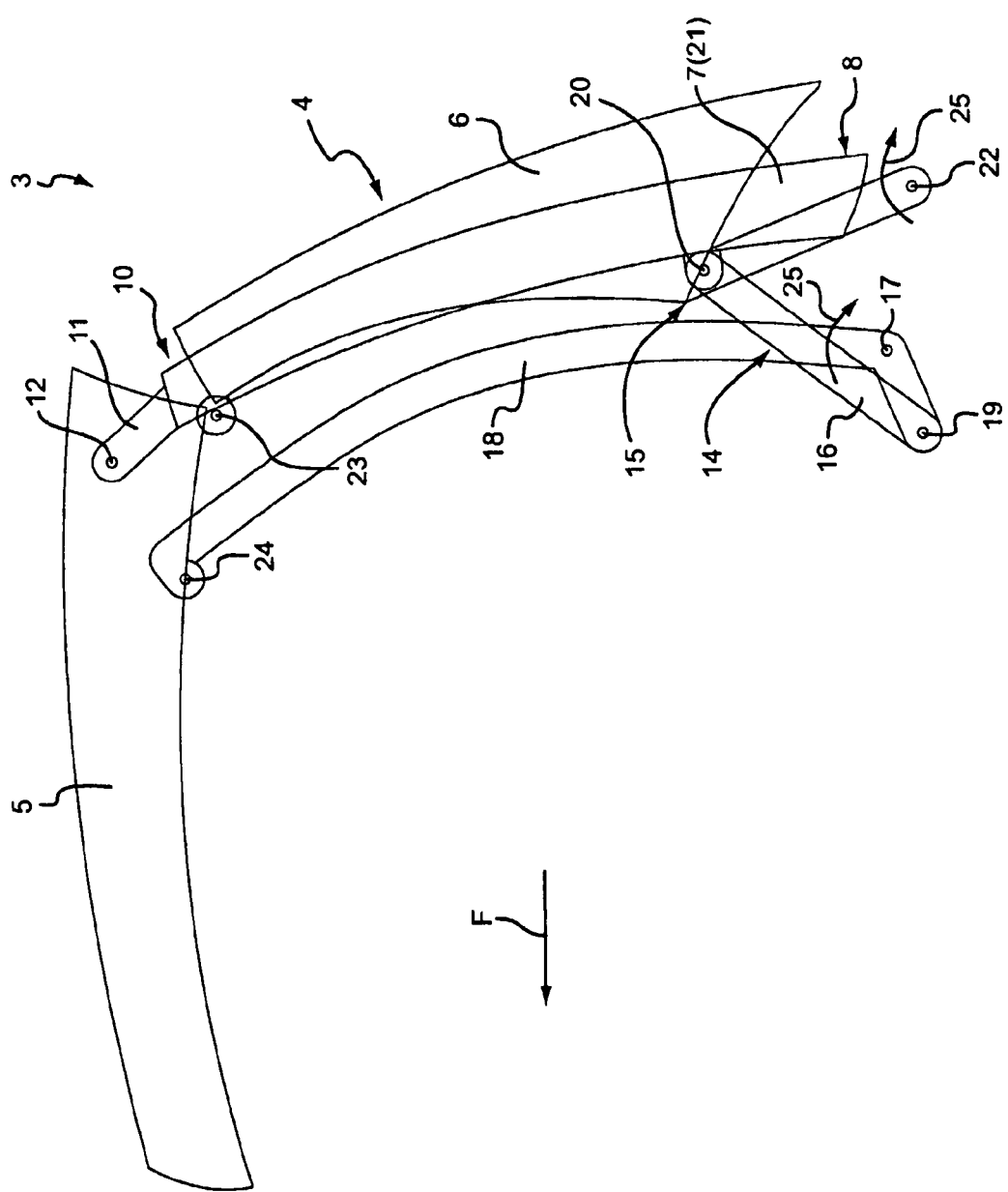
FIG. 3 is a similar view to FIG. 2 with a further progressing roof opening.
Figure 4:
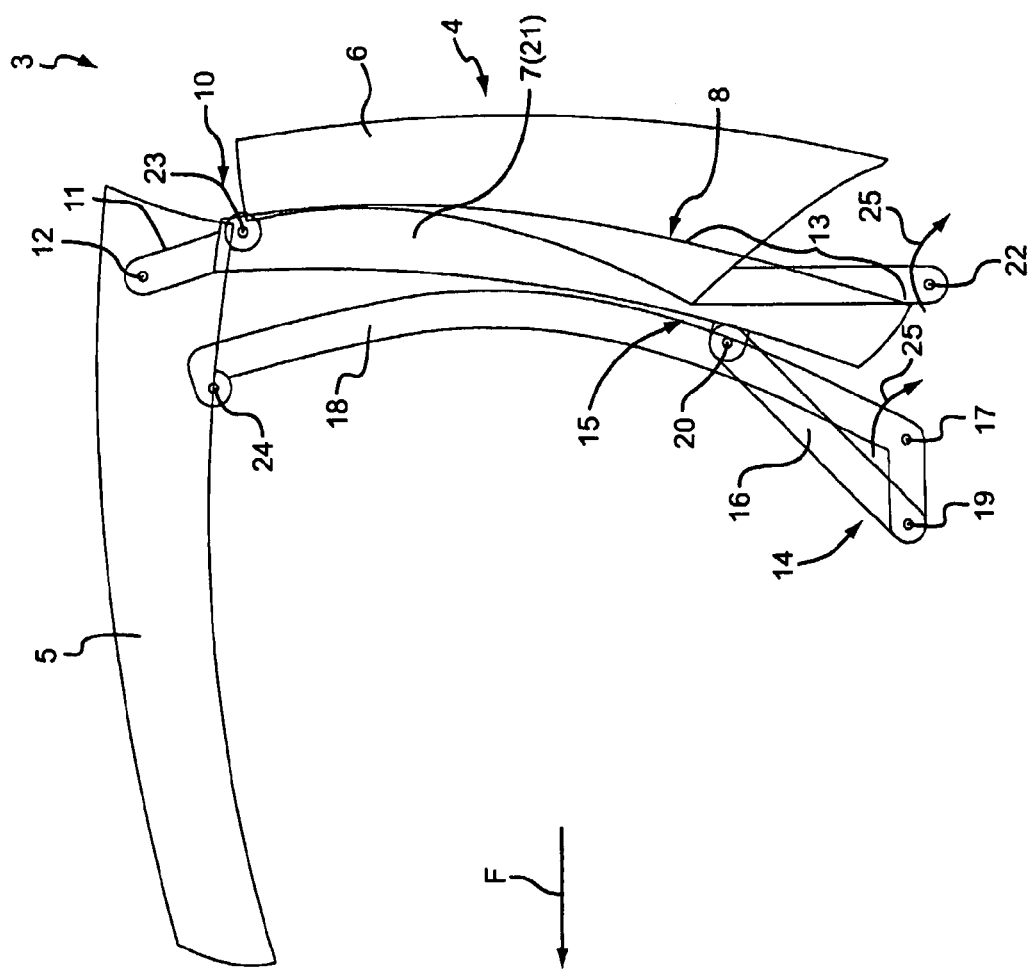
FIG. 4 is a similar view to FIG. 3 with a further progressing roof opening.
Figure 5:
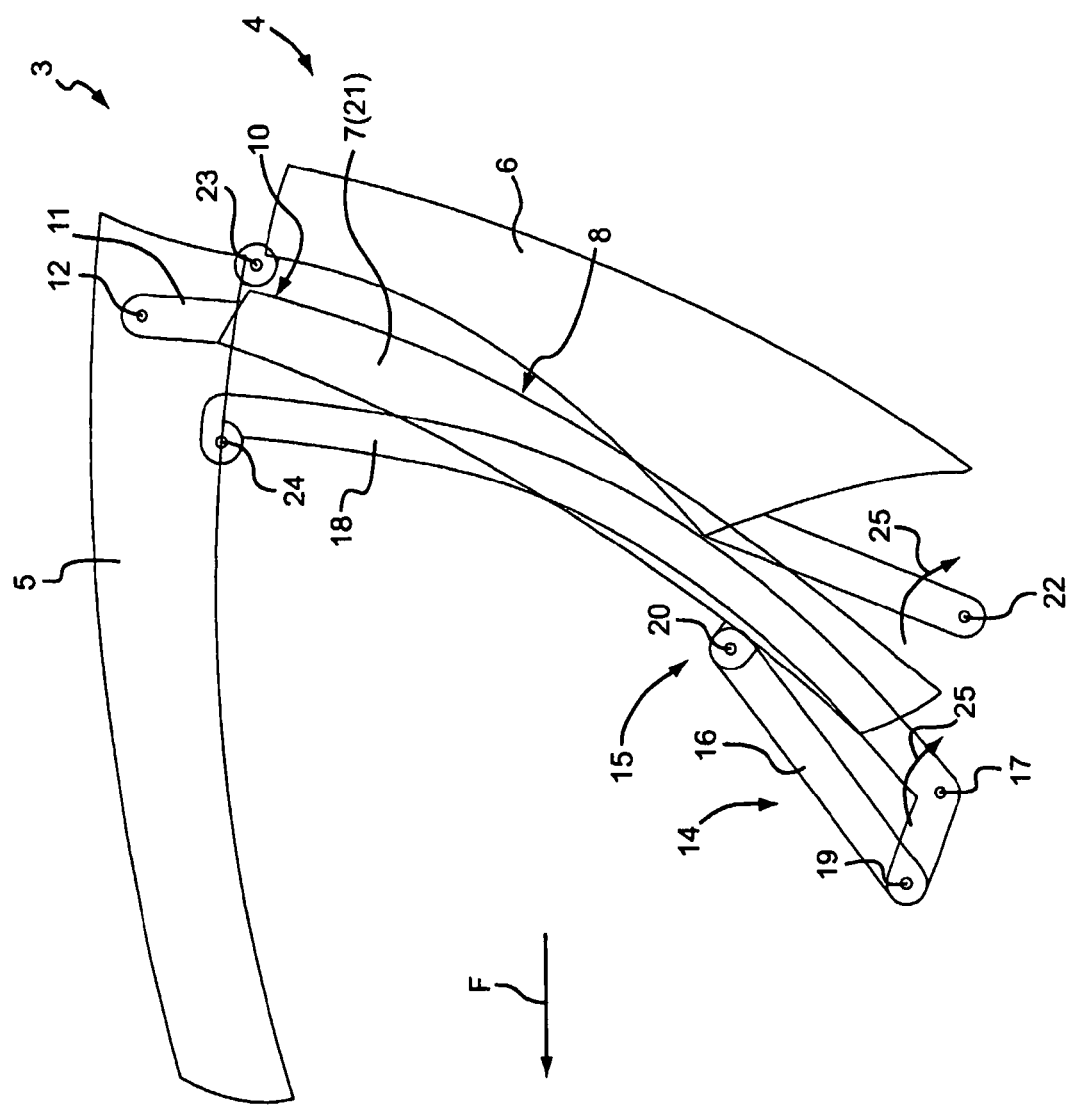
FIG. 5 is a similar view to FIG. 4 with a further progressing roof opening.
Figure 6:
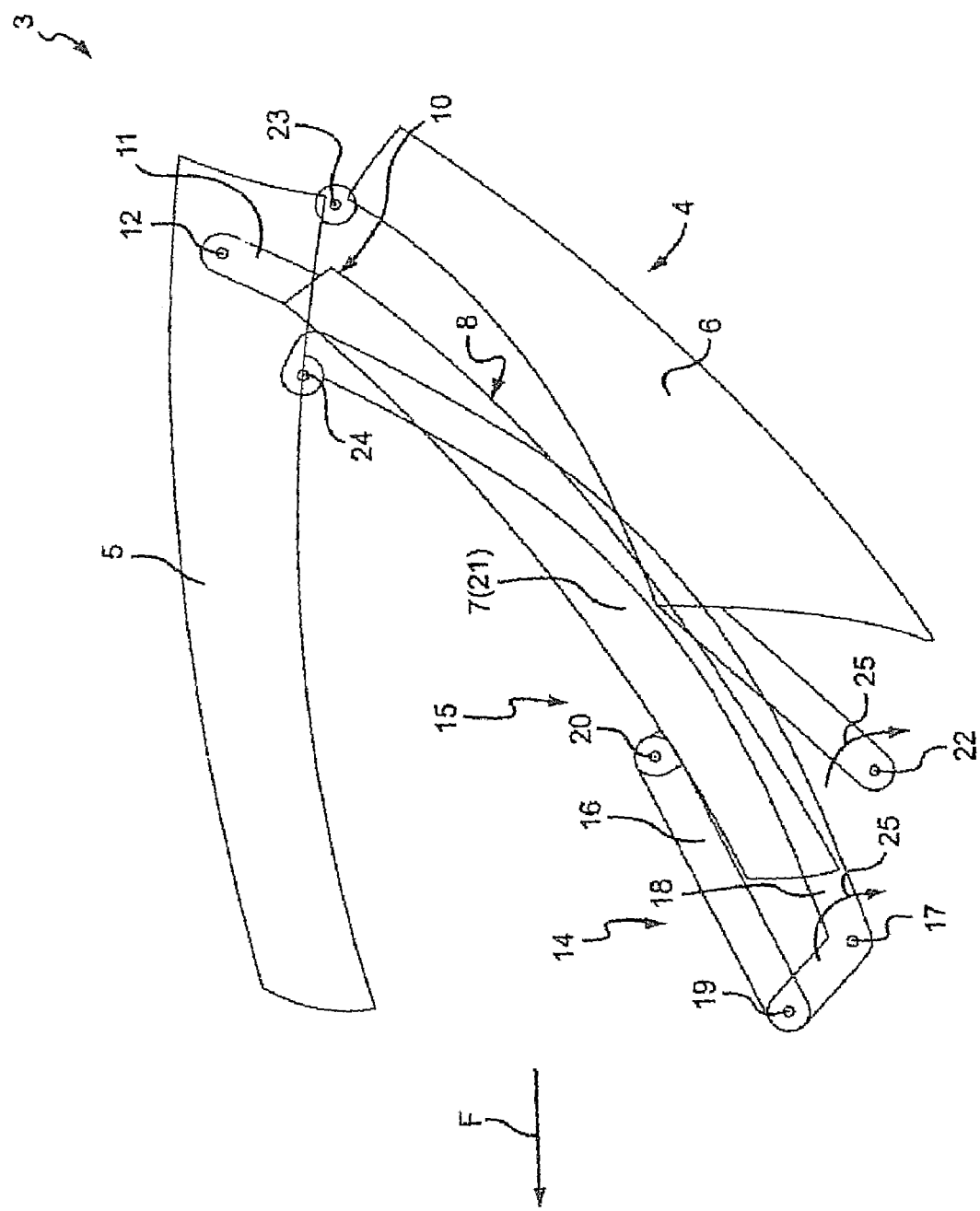
FIG. 6 is a similar view to FIG. 5 with a further progressing roof opening.
Figure 7:
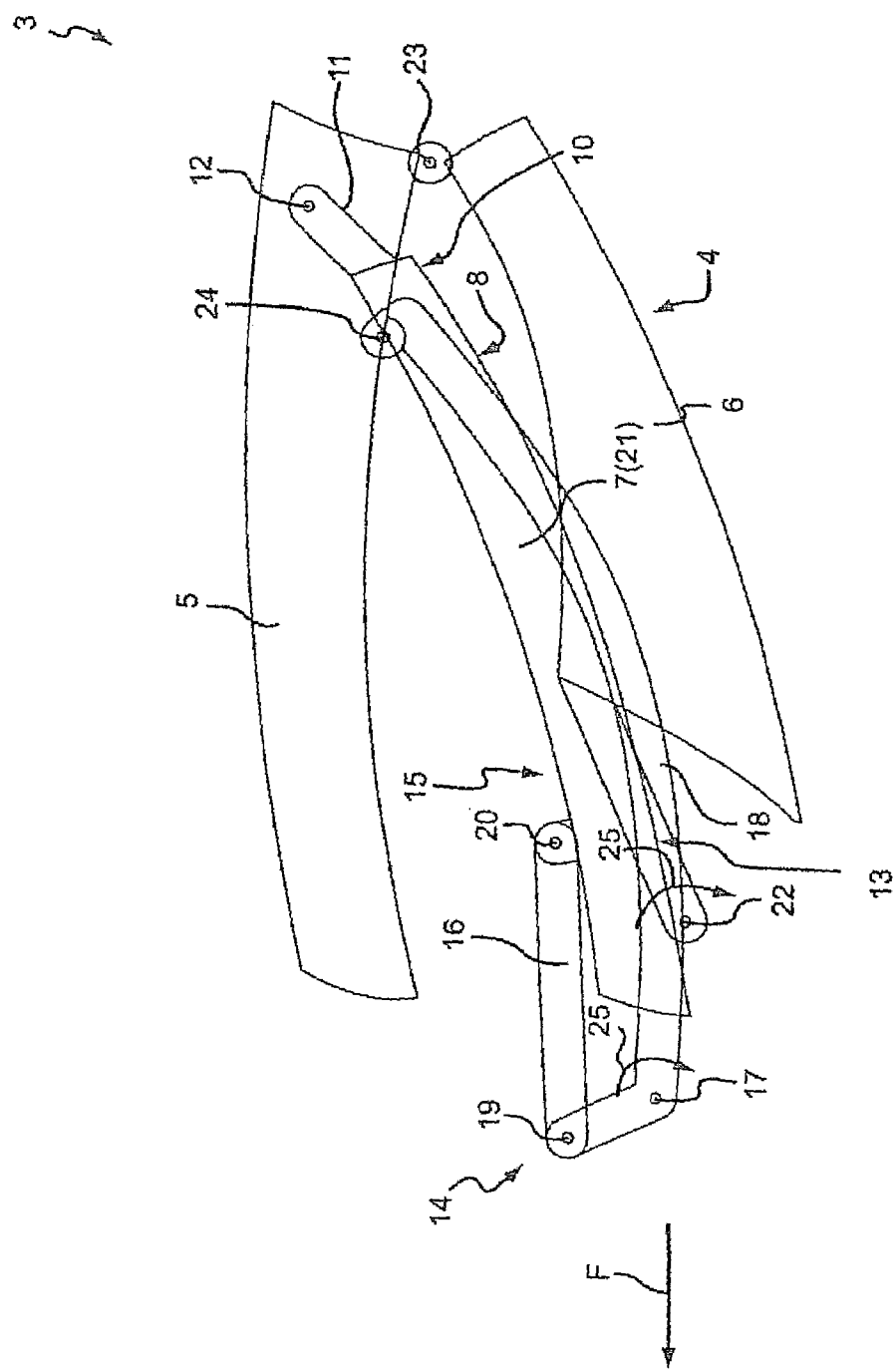
FIG. 7 is a similar view to FIG. 6 with an almost completely open roof.

Referring to the figures, a convertible vehicle according to the invention is generally indicated at 1. The vehicle 1 includes a movable roof 3. The movable roof 3, as shown here, which adjoins a windshield frame 2 indirectly or directly in the closed position, can include separate roof parts 4, 5 forming construction units provided with at least one rigid frame in each case or can form a soft-top covered overall with a common cover.

The roof 3 can be movable manually or fully automatically or partially automatically. The roof part 4 which is disposed at the rear with respect to the direction of travel F with a closed roof 3 is in every case divided into a plurality of regions 6, 7 movable with respect to one another, with the outer regions 6 here including "C-pillars" and a region 7 at the middle with respect to the transverse direction of the vehicle including a rear window 8. The middle region 7 can be substantially taken up by the rear window 8, in addition to connection parts, for good rear vision. The joints between the outer regions 6 and the middle region 7 can extend in a vertical plane disposed parallel to the direction of travel F or obliquely thereto. The roof part 4 may be referred to as a rearward roof part.

During the opening of the roof, the middle region 7 is upwardly displaceable with respect to the outer regions 6 in a movement explained in more detail below.

Figure 8:
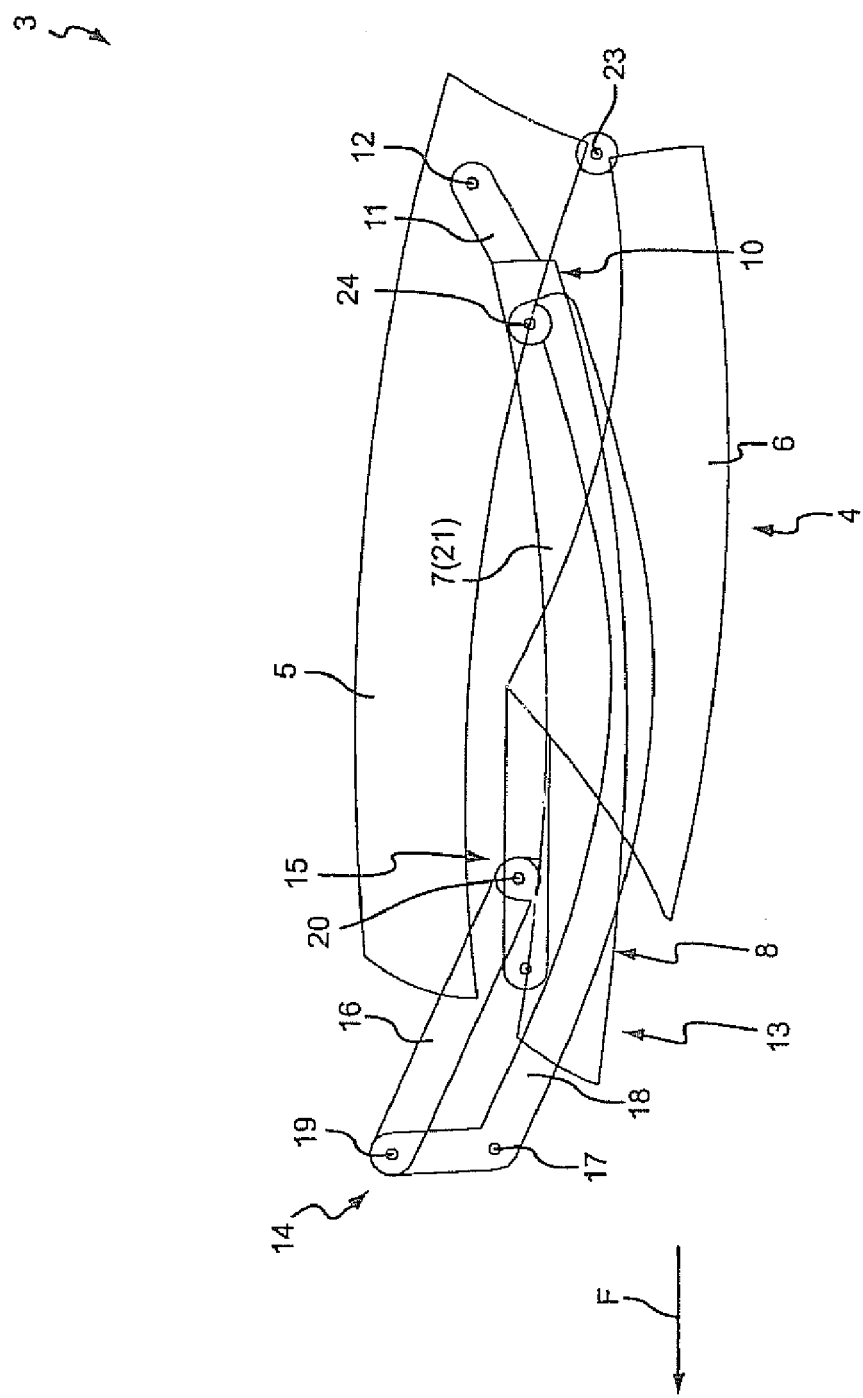
FIG. 8 is a similar view to FIG. 7 with a completely stowed roof.

At least one further roof part 5 is arranged at the front of the rearward roof part 4 in the direction of travel F when the roof is closed (FIG. 1) and is here disposed substantially horizontally over a passenger compartment 9 and is disposed above the rearward roof part 4 when the roof 3 is open (FIG. 8). Further roof parts adjoining at the front (not shown) are possible.

The top end 10 of the middle region 7, which is at the top when the roof 3 is closed, is connected to the forward roof part 5 by a joint 12 via a cantilever 11 and is connected in its lower region 13 to a movement linkage 14 displacing this region upwardly relative to the outer regions 6 during the opening of the roof. A further connection of the middle region 7 to the bodywork in its lower region 13 is not necessary.

In this connection, it becomes clear during the opening movement of the roof (FIG. 1 to FIG. 8) in the side view, the movement linkage 14 in the embodiment includes the lower lever 16 of a two-bar linkage 15.

For this purpose, the lower lever 16 is directly and co-movably connected to a lateral main bearing of the roof movement. In the illustrated embodiment, the lever 16 is held in a pivotally movable manner to a guide rod 18, which connects the forward roof part 5 to the bodywork K in a pivotally movable manner the joint 17, via a joint 19 moved along with the guide rod 18. The guide rod engages at the forward roof part 5 via the joint 24.

The two-bar linkage 15 includes, in addition to the lower lever 16 arranged at one or both vehicle sides, an upper lever 21 pivotable at a joint 20 to the lower lever 16. The upper lever 21 is formed by the middle region 7 and is therefore connected to the joint 12 to the forward roof part 5.

The lower lever 16 of the two-bar linkage 15 connects to the middle region 7, when the roof 3 is closed (FIG. 1), near the bottom, in particular at its lower third, or even better at its lower fourth, via the joint 20. The lever 16 thereby only slightly projects beyond a lateral beltline B of the bodywork K and practically does not encroach on the passenger compartment 9.

In the illustrated embodiment, the connection 19 of the lower lever 16 of the two-bar linkage 15, the pivot connection 20 of the upper lever 21 and the lower lever 16 of the two-bar linkage 15 and the connection 12 of the upper lever 21 to the forward roof part 5 are made as pure pivot hinges each having a degree of rotational freedom.

The outer regions 6 are formed rigidly per se over their whole longitudinal extent and are connected at the lower end to the bodywork K via a pivot joint 22 located at a cantilever and are connected at the upper end to the forward roof part 5 via a further pivot joint 23. The outer regions 6 therefore form main guide rods which, together with the guide rods 18, form a parallelogram or at least a four-bar linkage via the lower connections 22, 17 and the upper connections 23, 24.

The middle region 7 is also likewise connected to the forward roof part 5 arranged at the front during every phase of the roof movement via its joint 12. The requirement of a rotation of the parts 4, 5 toward one another on the closing of the roof is thereby omitted.

In addition, it is ensured by the pivot connection of the middle region 7 via the cantilever 11 that the top end 10 of the middle region 7 is disposed further in the direction of travel F in the stowed roof position (FIG. 8) than the rear end of the forward roof part 5. An additional extra space is thereby effected not only beneath the stowed roof, but also behind it.

To open the roof (procedure in accordance with FIG. 1 to FIG. 8), a pivot movement of the main guide rod 6 around the joint 22 and/or of the guide rod 18 around the joint 17 is effected in the direction of the arrow 25 via a drive (not shown). An optionally not driven (main) guide rod 6, 18 is co-pivoted due to the coupling via the roof part 5.

Since the movement linkage 14 is connected to the guide rod 18, it is moved along in a compulsory manner with its lever 16 during the opening or closing of the roof without a separate drive or a separate control being required for this purpose. The displacement of the rear window 8 with respect to the outer regions 6 is thus also effected in a compulsory manner with the roof movement. Alternatively, it would also be possible with an additional effort to provide a hydraulic cylinder as the movement linkage 14, for instance, which could be connected to the bodywork K at one end and to the middle region 7 at the other end.

It is furthermore ensured by the pivot connection of the middle region 7 via the cantilever 11 the forward roof part 5, in addition to the aforesaid forward displacement, that the top end 10 of the middle region 7 is raised relative to the outer regions 6 during the opening movement.

Unlike in the prior art, however, the lower region 13 is also raised by the two-bar linkage 15 during the opening of the roof, which has the consequence that the middle region 7 is raised over its whole longitudinal extent with respect to the outer regions 6 when the roof is open (FIG. 8) and the trunk is thus considerably enlarged with respect to a pure upward pivoting of the top end 10 of the middle region 7.

Since the middle region 7 is raised out of the sealing toward the outer regions 6 over its whole length in the same direction, throughgoing sealing sections without steps can be used, which simplifies the manufacture and the sealing. Since the lower lever 16 of the two-bar linkage 15 is held in near proximity to a dead center position when the roof is closed (FIG. 1), an advantageous substantial pressing force is additionally achieved on the sealing line in this position.

Finally, the invention also makes possible the provision of a sun roof (not shown) in the forward roof part 5 which can be displaceable via the middle region 7 and can be opened with it.

The invention has been described in an illustrative manner. It is, therefore, to be understood that the terminology used is intended to be in the nature of words of description rather than of limitation. Many modifications and variations of the invention are possible in light of the above teachings. For example, the convertible vehicle as described herein may be a two-seater vehicle with a front row of seats, or a four- or five-seater vehicle with both front and rear seats. Thus, within the scope of the appended claims, the invention may be practiced other than as specifically described.

I claim:

1. A retractable top for a motor vehicle having a passenger compartment, the top being movable between a closed position for covering the passenger compartment and an open position disposed in a storage area adjacent the passenger compartment, said top comprising:
    a first roof part pivotally coupled to the vehicle;
    a guide rod having one end pivotally coupled to the vehicle and an opposite end pivotally coupled to the first roof part at a first roof pivot;
    a second roof part having transversely spaced apart outer regions and a middle region extending therebetween, the outer regions of the second roof part being pivotally coupled to the first roof part at a second roof pivot and to the vehicle to form a four-bar linkage with the first roof part and the guide rod,
    the middle region of the second roof part having opposite distal and proximal ends, the distal end being pivotally coupled to the first roof part at a third roof pivot, the proximal end being coupled to a linkage for displacing the middle region relative to the outer regions towards the first roof part as the top is moved from the closed position toward the open position.

2. A retractable top as set forth in claim 1, wherein the middle region is raised with respect to the outer regions when the roof is in the open position.

3. A retractable top as set forth in claim 1, wherein the linkage includes a lower lever pivotally coupled to the guide rod and the middle region of the second roof part to form a two-bar linkage.

4. A retractable top as set forth in claim 3, wherein the lower lever of the two-bar linkage is pivotally coupled to a lower third of the middle region of the second roof part.

5. A retractable top as set forth in claim 3, wherein the pivotal coupling between the middle region and both the lower lever and the first roof part are defined by pivots each having a degree of rotational freedom.

6. A retractable top as set forth in claim 5, wherein the lower lever of the two-bar linkage is held in substantial proximity to a dead center position when the roof is in the closed position.

7. A convertible vehicle comprising:
    a movable roof having a closed position and a stowed position, the movable roof having a rearward roof part and a forward roof part, the rearward roof part being at the rear with respect to the direction of travel when the movable roof is in the closed position and the forward roof part being forward of the rearward roof part in the direction of travel when the movable roof is in the closed position, the forward roof part being disposed at least partially above the rearward roof part when the movable roof is in the stowed position;
    the rearward roof part being divided into a middle region having a rear window and two lateral outer regions, the middle region being upwardly displaceable with respect to the outer regions during the opening of the roof, the middle region having a top end and a lower region, the top end being above the lower region the movable roof is in the closed position;
    the top end of the middle region being connected to the forward roof part and the lower region being connected to a movement linkage that displaces this lower region upwardly relative to the outer regions during the opening of the movable roof; and
    the middle region forming an upper lever of a two-bar linkage, the linkage having a lower lever that is co-movably connected to a lateral lever of the movable roof, the lower lever forming at least part of the movement linkage.

8. A convertible vehicle in accordance with claim 7, characterized in that:
    the movement linkage is moved along in a compulsory manner during the opening or closing of the movable roof.

9. A convertible vehicle in accordance with claim 7, characterized in that:
    the upper lever of the two-bar linkage is connected in a pivotally movable manner to the forward roof part.

10. A convertible vehicle in accordance with claim 7, characterized in that:
    the rearward roof part and the forward roof part are each made as at least substantially rigid construction units which are separate from one another with respect to their outer surfaces.

11. A convertible vehicle in accordance with claim 7, characterized in that:
    both the outer regions and the middle region of the rearward roof part are connected in a pivotally movable manner to the forward roof part during every phase of the roof movement.

12. A convertible vehicle in accordance with claim 7, characterized in that:
    the middle region is raised with respect to the outer regions when the roof is in the stowed position.

13. A convertible vehicle in accordance with claim 7, characterized in that:
    the lateral lever of the movable roof is a guide rod pivotally supporting the forward roof part; and
    the lower lever of the two-bar linkage is pivoted to the guide rod.

14. A convertible vehicle in accordance with claim 13, characterized in that:
    the lower lever of the two-bar linkage is pivotally connected to the lower third of the middle region.

15. A convertible vehicle in accordance with claim 7, characterized in that:
    the connection of the lower lever of the two-bar linkage to the lateral lever and the connection of the upper lever to the lower lever of the two-bar linkage and the connection of the upper lever to the forward roof part are made as pivot joints each having a degree of rotational freedom.

16. A convertible vehicle in accordance with claim 15, characterized in that:

the lower lever of the two-bar linkage is held in near proximity to a dead center position when the roof is in the closed position.

* * * * *

UNITED STATES PATENT AND TRADEMARK OFFICE
CERTIFICATE OF CORRECTION

PATENT NO. : 7,712,817 B2  Page 1 of 1
APPLICATION NO. : 11/570388
DATED : May 11, 2010
INVENTOR(S) : Stefan Meinert It is certified that error appears in the above-identified patent and that said Letters Patent is hereby corrected as shown below:

Column 6, line 17: After "region" insert --when--.

Signed and Sealed this

Twenty-fourth Day of August, 2010

David J. Kappos
*Director of the United States Patent and Trademark Office*